United States Patent
Park et al.

(10) Patent No.: US 9,641,560 B2
(45) Date of Patent: May 2, 2017

(54) PERSONALIZED TELEPRESENCE SERVICE PROVIDING METHOD AND APPARATUS THEREOF

(71) Applicant: Electronics and Telecommunications Research Institute, Daejeon (KR)

(72) Inventors: Noh-Sam Park, Daejeon (KR); Jong-Hyun Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

(21) Appl. No.: 14/820,064

(22) Filed: Aug. 6, 2015

(65) Prior Publication Data

US 2016/0044066 A1  Feb. 11, 2016

(30) Foreign Application Priority Data

Aug. 7, 2014 (KR) .......................... 10-2014-0101856

(51) Int. Cl.
*H04L 29/06* (2006.01)
*H04W 4/16* (2009.01)
*H04W 4/02* (2009.01)

(52) U.S. Cl.
CPC ......... *H04L 65/1069* (2013.01); *H04W 4/021* (2013.01); *H04W 4/16* (2013.01)

(58) Field of Classification Search
None
See application file for complete search history.

(56) References Cited

U.S. PATENT DOCUMENTS

| 9,177,075 B2* | 11/2015 | Shitrit ............... G06F 17/30899 |
| 9,197,618 B2* | 11/2015 | Montgomery .......... H04L 63/08 |
| 2007/0112942 A1 | 5/2007 | Moquin et al. |
| 2013/0342637 A1 | 12/2013 | Felkai et al. |

FOREIGN PATENT DOCUMENTS

| KR | 1020110042311 A | 4/2011 |
| KR | 101311297 B1 | 9/2013 |

\* cited by examiner

*Primary Examiner* — Hong Cho
(74) *Attorney, Agent, or Firm* — William Park & Associates Ltd.

(57) ABSTRACT

Exemplary embodiments of the present invention relate to a telepresence service providing method and an apparatus thereof. The telepresence service providing method according to the present invention comprises: receiving at least one of current location information, peripheral device information acquired at the current location, and noise information acquired at the current location from a user device; generating or updating a service profile which specifies a service mode corresponding to the user device and a device profile which specifies functions which the user device and the peripheral devices can provide, based on the received information; and transmitting data for telepresence services to at least one device of the user device and the peripheral devices based on the profiles. According to exemplary embodiments of the present invention may provide a telepresence service with consideration of user's surrounding environment.

20 Claims, 13 Drawing Sheets

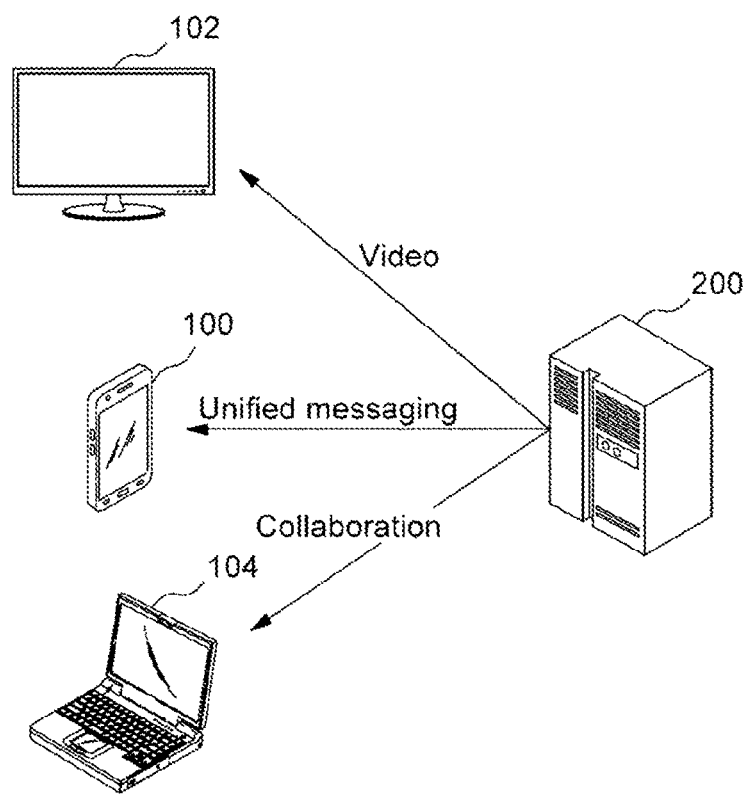

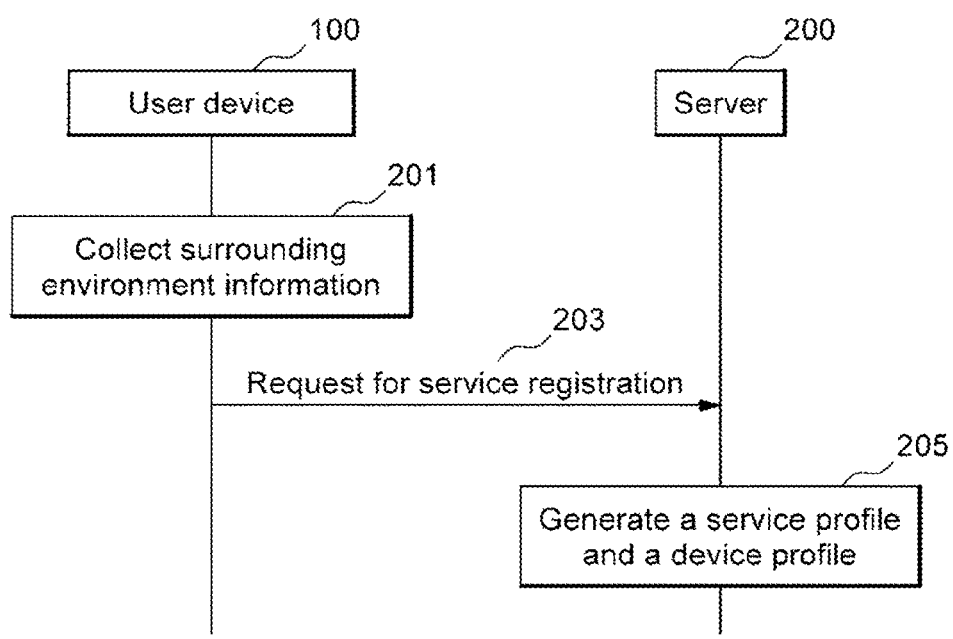

FIG. 3A

| ID | User name | User authority | POI | User location | Service status | Security status |
|---|---|---|---|---|---|---|
| ID01 | Mike Johnson | Conference producer | Video conference room, Lon1, Lat1, Hgh1 (Office, Lon2, Lat2, Hgh2) | (Lon3, Lat3) | Normal | Secured |
| ID02 | Amy Smith | Conference participant | Video conference room, Lon1, Lat1, Hgh1 (Branch office, Lon4, Lat4, Hgh4) (Home, Lon5, Lat5, Hgh5) | (Lon6, Lat6) | Manner | Non-secured |

FIG. 3B

| ID | Device name | Function | Priority |
|---|---|---|---|
| DEV01 | Apple iPhone 5S | V : O<br>A : O<br>UC : O<br>CX : X | UC |
| DEV02 | LG Smart TV | V : O<br>A : O<br>UC : O<br>CX : O | V |
| DEV03 | Apple Macbook Pro | V : O<br>A : O<br>UC : O<br>CX : X | CX |
| DEV04 | LG G-Pad | V : O<br>A : O<br>UC : X<br>CX : X | A |

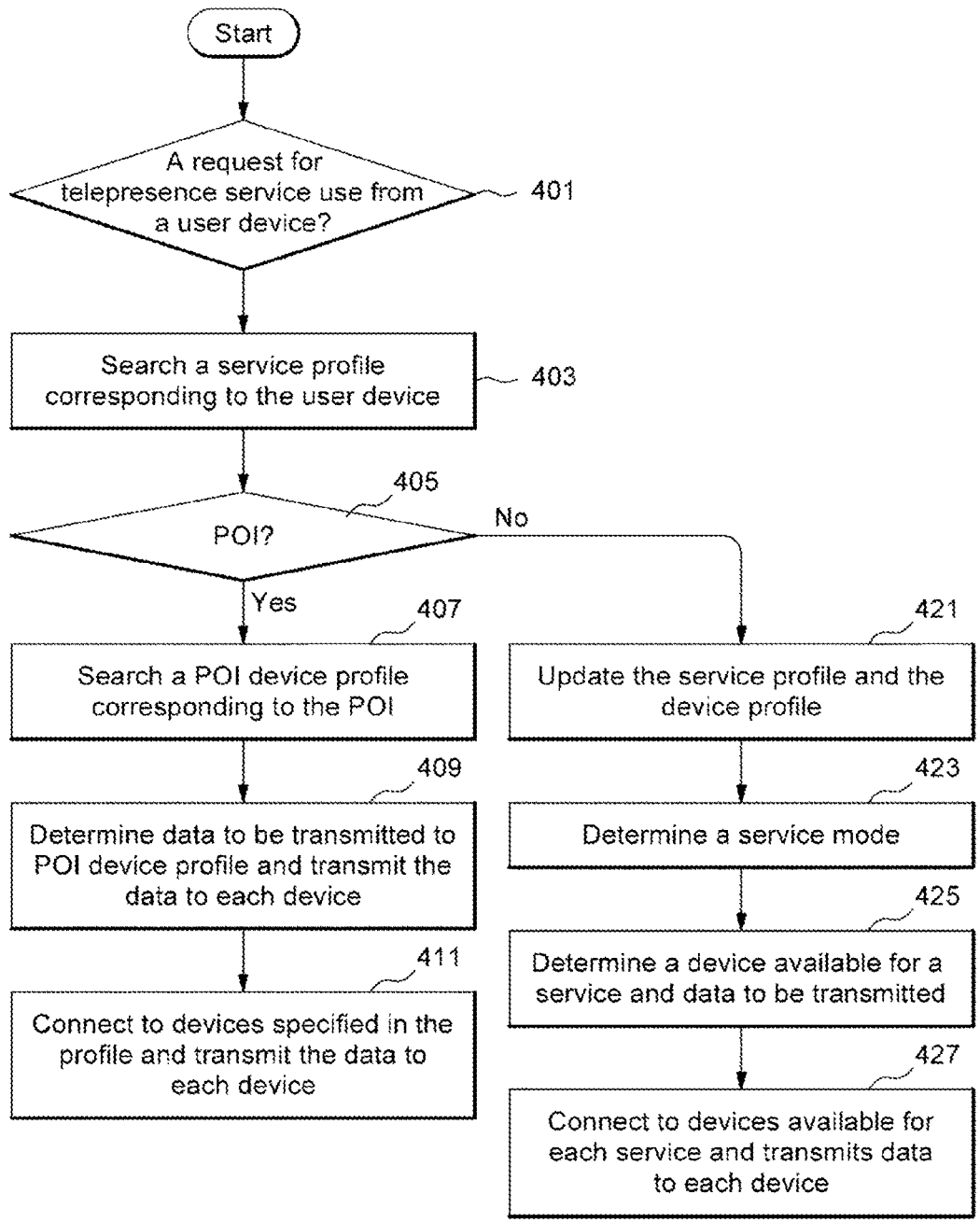

FIG. 5A

| ID | User name | User authority | POI | User location | Service status | Security status |
|---|---|---|---|---|---|---|
| ID01 | Mike Johnson | Conference producer | Video conference room, Lon1, Lat1, Hgh1 (Office, Lon2, Lat2, Hgh2) (Home, Lon7, Lat7, Hgh7) | (Lon3, Lat3) | Normal | Secured |
| ID02 | Amy Smith | Conference participant | Video conference room, Lon1, Lat1, Hgh1 (Branch office, Lon4, Lat4, Hgh4) (Home, Lon5, Lat5, Hgh5) | (Lon6, Lat6) | Manner | Non-secured |

FIG. 5B

| POI device profile (home, Lon7, Lat7, Hgh7) | | | |
|---|---|---|---|
| ID | Device name | Function | Priority |
| DEV01 | Apple iPhone 5S | V : O<br>A : O<br>UC : O<br>CX : X | UC |
| DEV02 | LG Smart TV | V : O<br>A : O<br>UC : O<br>CX : O | V |

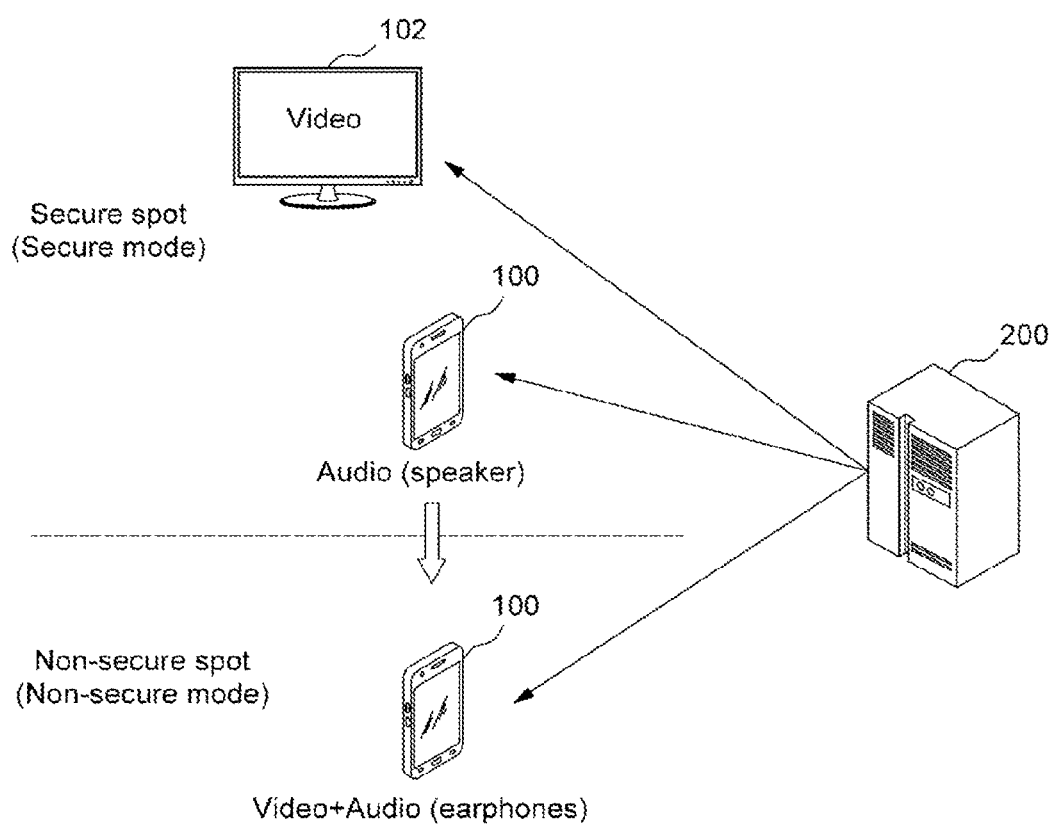

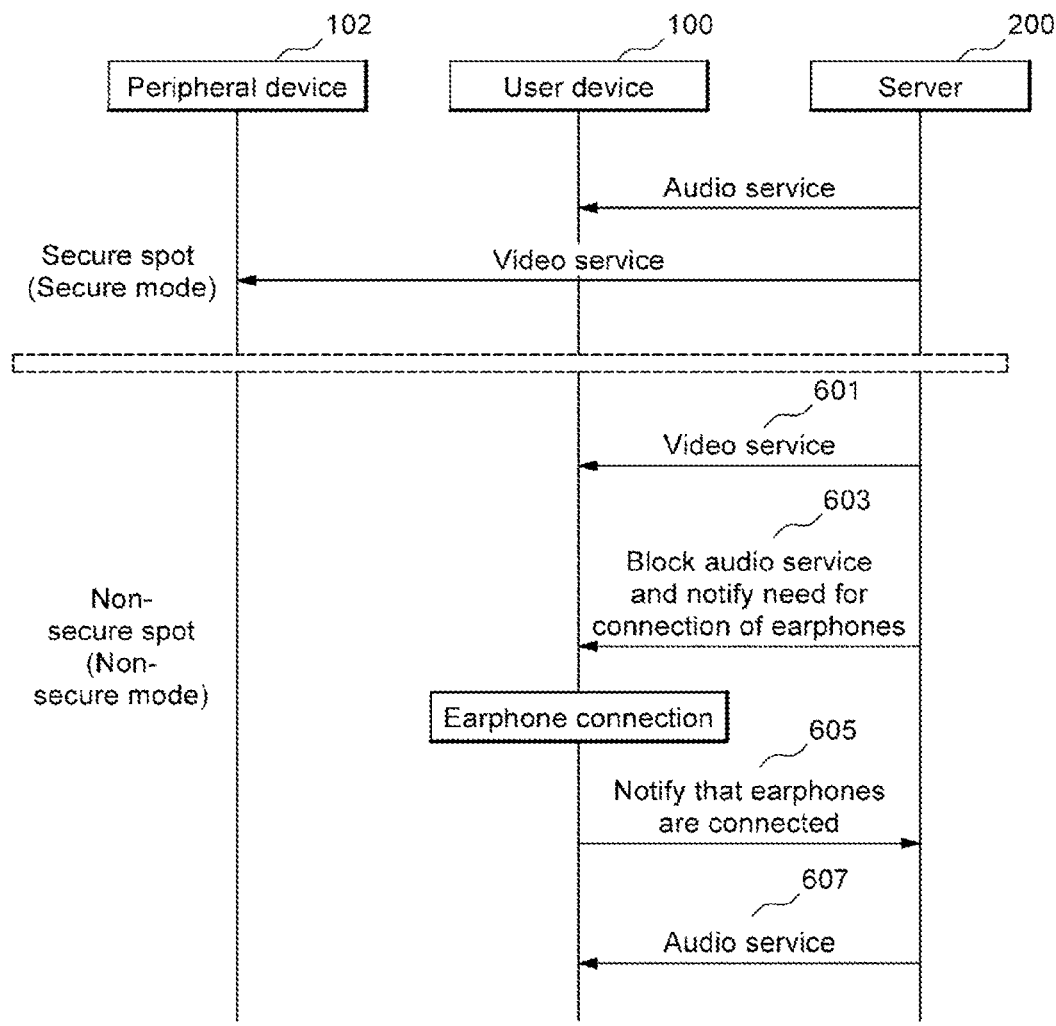

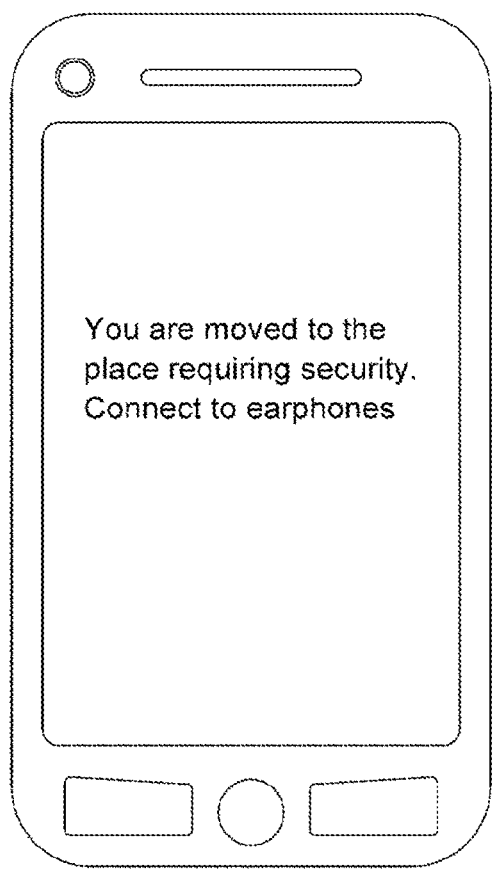

PERSONALIZED TELEPRESENCE SERVICE PROVIDING METHOD AND APPARATUS THEREOF

CROSS REFERENCE TO RELATED APPLICATION

This application claims the benefit of Korean Patent Application No. 10-2014-0101856, filed on Aug. 7, 2014, entitled "Personalized telepresence service providing method and apparatus thereof", which is hereby incorporated by reference in its entirety into this application.

BACKGROUND

1. Technical Field

Exemplary embodiments of the present invention relate to a telepresence service providing method and an apparatus thereof.

2. Description of the Related Art

A telepresence service provides vivid realism and convenient data sharing functions so that it can be cost-efficiencies resulting from reductions in downtimes and travel and improve productivity.

However, the telepresence services which have been currently provided are provided to conferencing rooms or desktops in which network environments are implemented but do not consider surrounding environments of a user such as user's location and context, etc.

While the telepresence technology is aimed for solving the problem of frequent travel of users, keeping the users from having a conference at a same location, the users are still bound to a specific location and a specific environment if the teleconference service is to be used.

SUMMARY

Exemplary embodiments of the present invention allow providing appropriate telepresence services to a user with consideration of user's surrounding environment.

A method for providing personalized telepresence services from a server according to an embodiment of the present invention may comprise: receiving at least one of current location information, peripheral device information acquired at the current location, and noise information acquired at the current location from a user device; generating or updating a service profile which specifies a service mode corresponding to the user device and a device profile which specifies functions which the user device and the peripheral devices can provide, based on the received information; and transmitting data for telepresence services to at least one device of the user device and the peripheral devices based on the profiles.

In an embodiment, the generating or updating a service profile may comprise determining any one service mode among a plurality of service modes based on the current location information and the noise information, and reflecting the determined service mode to the service profile, wherein each of the plurality of services has a different service attributes among each other. The transmitting data may comprise determining a device to which the data is to be transmitted based on the determined service mode and transmitting the data for telepresence services to the determined device. The service attributes may be related to at least one of a text service, an audio service and an image service. The service attributes may be related to at least one of editing, sharing and outputting the data. In an embodiment, the method may further comprise signaling with the user device to limit an audio service through a speaker and provide an audio service through earphones when the determined service mode is a mode which requires security.

In an embodiment, each device specified in the device profile may have a priority to at least one function among functions which can be provided by a corresponding device.

In an embodiment, the method may further comprise receiving POI (point of interest) information for registering POI from the user device and POI device information which is peripheral device information obtained at the POI; reflecting the received POI information to the service profile; and generating a POI device profile which specifies functions which the user device and the POI devices can provide. The method may further comprise transmitting data for telepresence services to the devices which are specified in the POI device profile when the received current location information is related to the POI.

In an embodiment, the generating a service profile comprises: transmitting the received current location information to at least one location information server of a network location information server, a GPS location information server and an indoor location information server and receiving the location information analyzed in a corresponding location information server; and generating the service profile based on the noise information and the analyzed location information in the location information server.

An apparatus for providing personalized telepresence services from a server according to an embodiment of the present invention may comprise: a context processing unit configured to receive at least one of current location information, peripheral device information acquired at the current location and noise information acquired at the current location from a user device; a profiler configured to generate or update a service profile which specifies a service mode corresponding to the user device and a device profile which specifies functions which the user device and the peripheral devices can provide, based on the received information; and a collaboration processing unit configured to transmit data for telepresence services to at least one device of the user device and the peripheral devices based on the profiles.

In an embodiment, the profiler may determine any one service mode among a plurality of service modes based on the current location information and the noise information and reflects the determined service mode to the service profile, wherein each of the plurality of services has a different service attributes among each other. The collaboration processing unit may determine a device to which the data is to be transmitted based on the determined service mode and transmit the data for telepresence services to the determined device.

In an embodiment, the collaboration processing unit may perform signaling with the user device to limit an audio service through a speaker and provide an audio service through earphones when the determined service mode is a mode which requires security.

In an embodiment, the context processing unit may receive POI information for registering POI from the user device and POI device information which is peripheral device information obtained at the POI, and the profiler may reflect the received POI information to the service profile and generate a POI device profile which specifies functions which the user device and the POI devices can provide. The collaboration processing unit may transmit data for telepresence services to the devices which are specified in the POI device profile when the received current location information is related to the POI.

In an embodiment, the context processing unit may transmit the received current location information to at least one location information server of a network location information server, a GPS location information server and an indoor location information server and receive the location information analyzed in a corresponding location information server. The profiler may generate the service profile based on the noise information and the analyzed location information in the location information server.

According to exemplary embodiments of the present invention, it allows providing a telepresence service based on user's surrounding environment. According to exemplary embodiments of the present invention, it allows providing a telepresence service by taking full advantages of devices which exist around the user. According to exemplary embodiments of the present invention, it allows controlling service attributes to prevent steams of sensitive data by considering user's surrounding environment. According to exemplary embodiments of the present invention, it also allows providing a telepresence service appropriate to a user by using various sensors equipped with a user's device without using any additional equipment.

BRIEF DESCRIPTION OF DRAWING

FIG. 1A and FIG. 1B illustrates a method for providing personalized telepresence services according to exemplary embodiments of the present invention.

FIG. 2 illustrates a process for registering a personalized telepresence service according to an embodiment of the present invention.

FIG. 3A illustrates a service profile according to an embodiment of the present invention.

FIG. 3B illustrates a device profile according to an embodiment of the present invention.

FIG. 4 is a flowchart illustrating a process for using a personalized telepresence service according to an embodiment of the present invention.

FIG. 5A and FIG. 5B illustrates POI according to an embodiment of the present invention.

FIG. 6A illustrates a process for changing a personalized telepresence service according to an embodiment of the present invention.

FIG. 6B is a flowchart illustrating a process for changing an audio service attributes according to an embodiment of the present invention.

FIG. 6C illustrates a guide message when a service mode is changed according to an embodiment of the present invention.

DESCRIPTION OF THE EXEMPLARY EMBODIMENTS

Throughout the description of the present invention, when describing a certain technology is determined to evade the point of the present invention, the pertinent detailed description will be omitted.

Hereinafter, exemplary embodiments of the present invention will be described with reference to the accompanying drawings.

Figure 1B:
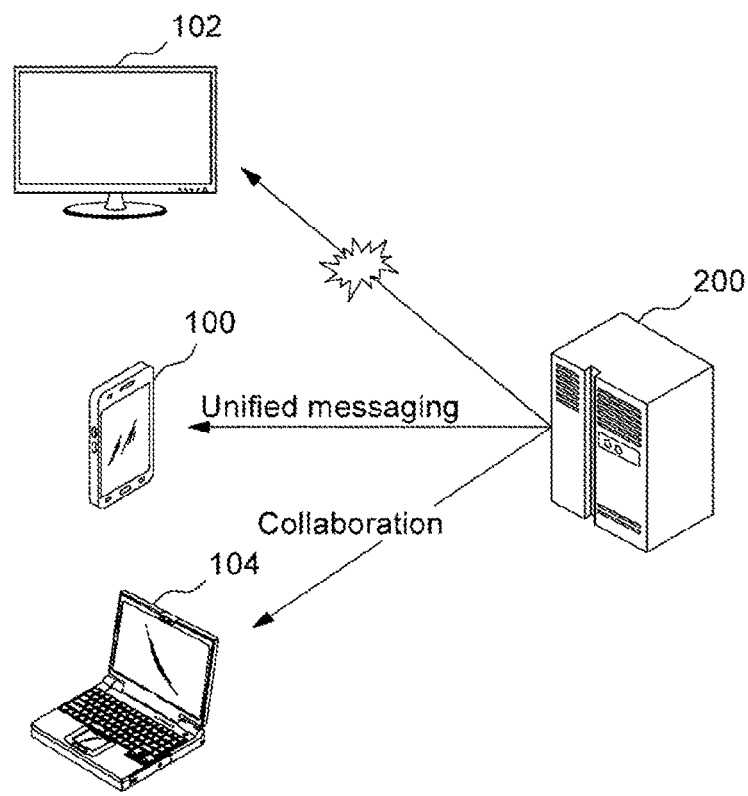

FIG. 1A and FIG. 1B illustrates a method for providing personalized telepresence services according to exemplary embodiments of the present invention.

A telepresence service may be provided to one or more devices. For example, several services may be distributed and provided to a user device 100 and a plurality of peripheral devices 102, 104 existing around the user device 100 in which a client program to access to a telepresence service providing server 200 is embedded as shown in FIG. 1A. For example, a unified messaging service is provided to the user device 100, a video service is provided to the peripheral device 102, and a collaboration service is provided to the peripheral device 104.

As described above, a conventional telepresence service is provided to a user in a specific environment.

When a user is in the environment where a certain device cannot be used or in the environment where a certain device is not recommended to use, or a user has limitation to available devices at a certain location, it is required to provide telepresence services based on user's environment.

For example, when providing a video service is not desired due to the presence of others around a user, it is appropriate not to provide the video service among telepresence services as shown in FIG. 1B.

Exemplary embodiments of the present invention allow providing personalized telepresence services to a user with consideration of user's surrounding environment.

Hereinafter, throughout the description of the present invention, it is assumed that a user device or a peripheral device is an electronic device which can output data in any type of video, voice and text, etc. For example, the electronic device may be any one of a mobile phone, a smartphone, a navigator, a personal digital assistant (PDA), a portable multimedia player (PMP), a tablet, a netbook, a desktop computer, a notebook computer, a television, a head mounted display (HMD), a head-up display (HUD) and a communication terminal which is able for internet access.

Throughout the description of the present invention, it is described by assuming that a user device and at least one peripheral device around the user device are present. However, exemplary embodiments of the present invention may be applied when any peripheral device is not present around the user device. For example, according to exemplary embodiments of the present invention, personalized telepresence services may be provided to a user by deactivating at least one of various data output methods which are supported by the user device.

FIG. 2 illustrates a process for registering a personalized telepresence service according to an embodiment of the present invention.

In S201, the user device 100 collects surrounding environment information. The surrounding environment information may include at least one of location information of the user device 100, peripheral device information around the user device 100, and noise information around the user device 100.

In S203, the user device 100 requests for telepresence service registration to a server 200. When the registration is requested, the surrounding environment information collected in S201 may be transmitted to the server 200. Furthermore, when the registration is requested, the user device 100 may transmit predetermined information such as its device identifier and the like to the server 200.

In S205, the server 200 generates a service profile and a device profile which are used to provide personalized telepresence services to the user device 100 based on the surrounding environment information received from the user device 100. FIG. 3A illustrates an example of a service profile and FIG. 3B illustrates a device profile generated in the server 200.

FIG. 3A illustrates a service profile according to an embodiment of the present invention.

The service profile may include at least one of information about device identifier, user ID, user authority, point of interest (POI), user location, service status and security status.

The device identifier may be, for example, media access control (MAC) address of a corresponding device.

The user ID may be information inputted by the user who carries a corresponding device, for example, a user name.

The user authority may be divided by roles which can be assigned when a user uses a telepresence service, for example, into a conference producer, a speaker, a conference participant and an observer, etc. A user may control service uses depending on authorities.

The POI may be a location which is determined by a user. For example, a user may input information about places where he/she visits frequently in advance. When a user locates at POI, a personalized service corresponding to the POI may be provided without consideration of peripheral device information and noise information. The POI may be a location where a user uses frequently such as a video conferencing room, an office, a branch office and home, etc. and be stored by {POI names, location information}.

The user location may indicate information about current location where a user device is currently located and be changed when the location of the user device is changed.

The service status may be mode information having different service attributes. The service status may be determined based on at least one of location information and noise information obtained from the user device. The service attributes may be related to at least one of a text service, an audio service and an image service. The service attributes may be related to at least one of editing, sharing and outputting data. The mode may be, for example a normal mode or a manner mode.

For example, when it is determined as that a user can use a service normally at the place where security is ensured, the service status may be set as a normal mode.

For example, when a user is in a public place or moving, when a user is located in a public place and peripheral noise is higher than a predetermined threshold, or when it is determined as that several services such as video and audio services cannot be used, the service status may be set as a manner mode. When it is in a manner mode, the least telepresence service is provided such that a conference based on texts is provided or alarm is provided only to the content marked as important agenda by conference participants. According to an embodiment, participation through a speaker may not be allowed but participation through earphones may be allowed in the manner mode.

The security status may be in a secure mode or a non-secure mode depending on whether a user is located in a secure spot or not. The security status may be determined based on location information obtained from the user device. The secure spot may represent location information of which security is approved from a user's group. The secure spot may be stored by {secure spot ID, location information} or the like. When it is determined as that a user is in a secure spot, the security status may be as a secure mode and in the other case, it may be set as a non-secure mode.

When it is in a non-secure mode, use of collaboration functions such as editing and/or sharing data, sharing screens may be limited to prevent leak of secure data and contents and further, access to secure data may not be possible. In addition, when it is in a non-secure mode, conference participation using a speaker may be restricted and thus only participation using earphones may be allowed.

When the service status is set in a manner mode or when the security status is set in a non-secure mode, the server may notify the status to its user devices. For example, the server may provide a notification message to inform service limit to user devices. Or the server may provide a notification message to assist service offering to user devices. For example, the server may provide a message to wear earphones for conference participation.

FIG. 3B illustrates a device profile according to an embodiment of the present invention.

A device profile includes information about devices such as a user device and peripheral devices to which telepresence services can be provided. The device profile may include at least one of a device identifier, a device name, functions of a device, and priority of a device.

The device identifier may be a MAC address of a corresponding device.

The device name may be a corresponding device's own name, for example, a trade name.

The function of a device may be functions which the device provides, such as V (Video), A (Audio), UC (Unified Communication), CX (Collaboration eXperience) and the like. Unified communication is the integration of communication services including video, instant messaging (chat) and the like and collaboration experience allows collaboration such as data sharing, screen sharing or cooperating work.

When a plurality of devices provide a number of functions, a service through one function by each device may be provided. For example, this may be performed by referring to priority information specified for each device. For example, when the priority is given to UC for a device which provides all functions of V/A/UC/CX, the device may provide a service through UC function. Priority information may be set arbitrarily in the server or set by a user. Priority information may be set not to overlap between devices.

FIG. 4 is a flowchart illustrating a process for using a personalized telepresence service according to an embodiment of the present invention.

In S401, the server determines if there is a request for telepresence service use and if there is, it proceeds to the next step S403. The service use request may include at least one of identifier information, location information, peripheral device information and noise information of a corresponding user device.

In S403, the server searches a service profile corresponding to the user device which requested for telepresence service use.

In S405, the server determines whether current location information of the user device is POI by referring to the searched service profile and if it is POI, it proceeds to the next step S407. On the other hand, if it is not POI, it proceeds to S421.

For example, as shown in FIG. 5A, when current location information (Lon7, Lat7) of a user device is registered as POI in a service profile, it proceeds to S407. Registration of POI may be carried by a request of the user device. When registration of POI is requested, location information and peripheral device information of a user device may be collected and analyzed to generate a device profile corresponding to the POI.

In S407, the server searches a POI device profile corresponding to the POI. The POI device profile is used to provide predetermined personalized services corresponding to POIs which are determined by a user. An example of a POI device profile is illustrated in FIG. 5B. Referring to FIG. 5B, a POI device profile includes device information to be used for providing services at POI (home, Lon7, Lat7, Hgh 7). When user's current location information is POI, services may be provided according to a POI device profile without searching noise information and peripheral devices.

In S409, the server determines data to be transmitted to devices specified in the POI device profile.

In S411, the server connects to devices specified in the POI device profile and transmits the data to each device.

In S421, the server updates the service profile and the device profile corresponding to the user device. The update may be carried based on at least one of location information, peripheral device information and noise information of the user device.

In S423, the server determines a service mode. The service mode may include, for example, service status and security status. The service mode may be determined, for example, based on at least one of current location information of a user device and the noise information acquired at the current location.

In S425, the server determines a device available for a service and data to be transmitted. The device available for a service may be a device which is able for a service in the determined service mode from the devices specified in the device profile. For example, when the service mode is determined as a manner mode, the server may determine not to transmit data to a TV which outputs video.

In S427, the server connects to devices available for each service and transmits the data to each device.

When location and surrounding environment of a user is changed during a telepresence service is used, service attributes of the telepresence service which is being used may be changed. For example, when the user who is provided with the telepresence service moves from a secure spot to a non-secure spot or the peripheral environment of the user where any other user is not present is changed to that where there is another user during a telepresence service is used, service attributes of the telepresence service which is being used may be changed. This case will be described with reference to FIG. 6A, FIG. 6B and FIG. 6C.

FIG. 6A illustrates a process for changing a personalized telepresence service according to an embodiment of the present invention.

As shown in FIG. 6A, it is assumed that a user is being provided with a telepresence service corresponding to a secure mode in a secure spot, and a video service is provided through a peripheral device 102 and an audio service is provided through a user device 100 located in the secure spot.

The server 200 may identify whether there is any changes in location and surrounding environment of a user by obtaining periodically location information, peripheral noise information and peripheral device information from the user device 100. A telepresence service attributes may be changed according to the identified condition.

When it is determined as that the user device 100 is moved from a secure spot to a non-secure spot, the server 200 may change service attributes of the telepresence service which is being used. For example, the server 200 may block the video service provided to the peripheral device 102 for security. The blocked video service may be provided to the user device 100.

The server 200 may also change service attributes of the audio service which is being provided to the user device 100. Changing service attributes of the audio service may mean limiting audio service through a speaker but only providing audio service through earphones. This is explained with reference to FIG. 6B.

FIG. 6B is a flowchart illustrating a process for changing an audio service attributes according to an embodiment of the present invention.

As explained by referring to FIG. 6A, it is assumed that a user is at a secure spot and a video service is provided through a peripheral device 102 and an audio service is provided through a user device 100. It is also assumed that the user moves to a non-secure spot so that service corresponding to the non-secure spot is needed.

In S601, the server 200 blocks a video service provided to the peripheral device 102 and provides the video service to the user device 100.

In S603, the server 200 blocks the audio service provided to the user device 100 and generates a message requesting for earphone connection to transmit to the user device 100.

When the message requesting for earphone connection is received from the server 200, the user device 100 may provide a guide message informing that earphone connection is needed to the user. The guide message may be carried by voice or video output and an example of the video output is illustrated in FIG. 6C.

When earphones are connected according to the guide message, the user device 100 transmits a message informing that earphones are connected to the server 200 in S605. If earphones have been already connected to the user device 100, the user device 100 may generate a message informing that earphones have been already connected to transmit to the server 200 without outputting the guide message.

In S607, the server provides the blocked audio service to the user device 100.

When the earphones are disconnected from the user device 100, the user device 100 generates a message informing that the earphones are disconnected to transmit to the server 200. Here, the server 200 may again block the audio service provided to the user device 100.

In the embodiment described with reference to FIG. 6A, FIG. 6B and FIG. 6C, the case that the user moves from a secure spot to a non-secure spot is explained. Such an embodiment may be applied to various conditions which have mode changes. For example, when it is determined as that a user moves from the environment where there is no people around to the environment where there are others around during services in a normal mode are provided, attributes of the service is changed and thus services in a manner mode may be provided.

Figure 7:
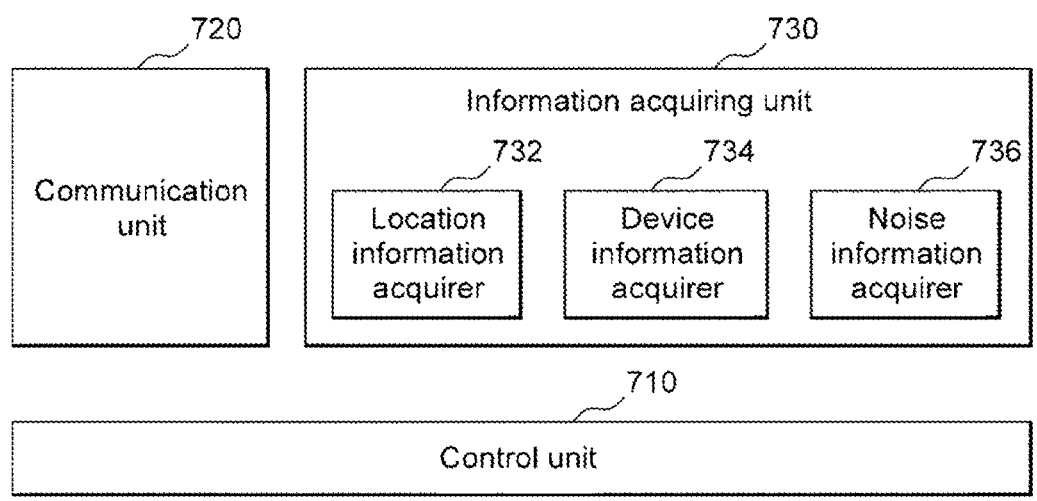
FIG. 7 is a block view illustrating a user device in which exemplary embodiments of the present invention are applied.

FIG. 7 is a block view illustrating a user device in which exemplary embodiments of the present invention are applied.

A user device in which exemplary embodiments of the present invention are applied includes a control unit 710, a communication unit 720 and an information acquiring unit 730. At least one component among those components may be omitted. The control unit 710 controls various operations needed to provide telepresence services. For example, when there is a request for registering or using a telepresence service from a user, the control unit 710 controls the information acquiring unit 730 to acquire peripheral information and transmit the acquired peripheral information to the server. When data for the telepresence service is received from the server, the control unit 710 may output the data on a screen or through a speaker.

When a message informing that earphone connection is needed for providing an audio service is received from the server, the control unit 710 may output a guide message informing that earphone connection is needed to a user through voice or video. When earphone connection is detected, the control unit 710 may generate a message informing that earphones are connected to transmit to the server. If earphones have been already connected, the control unit 710 may generate a message informing that earphones have been already connected to transmit to the server without outputting the guide message.

The communication unit 720 may communicate with the server by using various communication methods.

The information acquiring unit 730 acquires peripheral information of the user device. The peripheral information may include at least one of current location information, peripheral device information and noise information. The information acquiring unit 730 may equipped with various sensors and equipments to acquire peripheral information. For example, the information acquiring unit 730 may be equipped with a GPS module, a Wi-Fi module, a Bluetooth module, a UPnP module, a microphone and the like.

The information acquiring unit 730 may include at least one of a location information acquirer 732, a device information acquirer 734 and a noise information acquirer 736 to acquire peripheral information by using various sensors and equipments.

The location information acquirer 732 acquires location information of a user. For example, the location information may be IP address information and the collected IP address information may be used to determine an exact user's location by being transmitted to the server.

The location information using network may cause error since the location of an IP-allocated address is provided and thus a GPS sensor may be used to compensate this error. Latitude and longitude information may be collected in real time with movement of the user from the GPS sensor to be transmitted to the server. GPS-based location information may cause an error of 1-500 m depending on accuracy of the sensor and only 2-dimensional location information may be represented. When a gyroscope sensor is equipped with the user device, it may allow 3-dimensional location information identification and accordingly, accurate location such as floor identification within a building may be determined.

The device information acquirer 734 acquires information about peripheral devices existing around the user device by using a peripheral device search protocol. For this purpose, the near field communication technology such as WiFi, UPnP, Bluetooth and the like may be used. For example, when search using a Bluetooth sensor equipped with a smartphone which is the user device is possible, the device information acquirer performs search using the Bluetooth sensor. When various Bluetooth-supporting devices such as a smart TV, a tablet, a laptop, a mouse and a keyboard, etc. around the user device are searched, equipments which are able to receive telepresence services may be determined as available peripheral devices. In this case, the smart TV, the tablet, the laptop, etc. excepting the mouse and the keyboard are indicated as available peripheral devices.

The noise information acquirer 736 collects peripheral noise information using a microphone or the like. The noise information acquirer 736 may collect only information within a voice frequency range among the collected noise information. The collected noise data may be used to determine whether there is any other people around the user by being transmitted to the server.

In an embodiment, the user device performs the least data classification to screen abnormal data out and analysis of the collected data may be performed at the server. Such data processing may vary with data processing ability of the user device.

Figure 8:
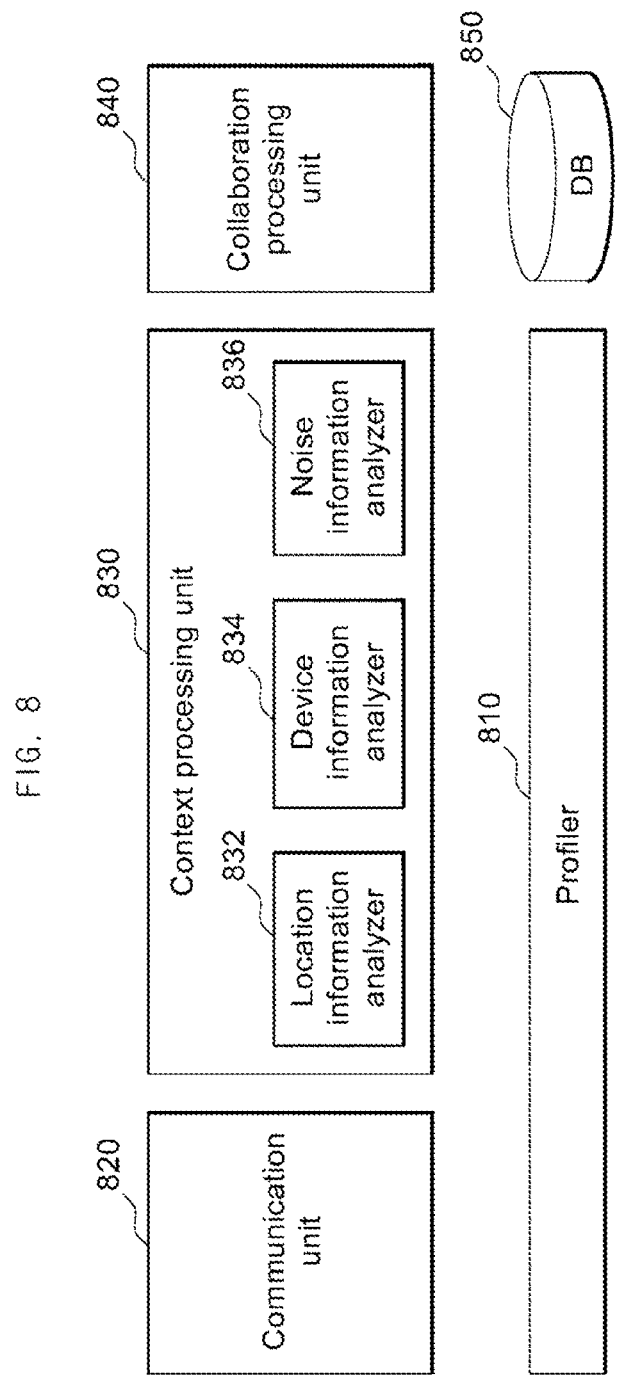
FIG. 8 is a block view illustrating a personalized telepresence service providing server in which exemplary embodiments of the present invention are applied.

FIG. 8 is a block view illustrating a personalized telepresence service providing server in which exemplary embodiments of the present invention are applied.

A personalized telepresence service providing server in which exemplary embodiments of the present invention are applied includes a profiler 810, a communication unit 820, a context processing unit 830, a collaboration processing unit 840 and a database 850. At least one component among those components may be omitted.

The profiler 810 may include a service profiler which manages a service profile and a device profiler which manages a device profile. The profiler 810 may manage the service profile and the device profile by interfacing with the context processing unit 830 and the collaboration processing unit 840. The profiler 810 may conduct profile information processing through CRUD (Create, Read, Update, Delete) functions for the service profile and the device profile.

The communication unit 820 may communicate with the user device by using various communication methods.

The context processing unit 830 may analyze surrounding environment of the user device based on surrounding environment information received from the user device. The analyzed information may be stored in the service profile and the device profile.

The context processing unit 830 may include at least one of a location information analyzer 832, a device information analyzer 834 and a noise information analyzer 836.

The location information analyzer 832 analyzes location information received from the user device to determine an accurate location of the user device.

The device information analyzer 834 analyzes available peripheral device information received from the user device.

The noise information analyzer 836 may determine whether there is any other people around the user based on the noise information received from the user device. For example, the noise information analyzer 836 may determine whether there is any other people around the user by classifying noise by relative sound intensity. When it is determined as that there is other people in the relatively short distance to the user, limited services based on the location information analyzed from the location information analyzer may be provided. For example, when the user device is located in a public place and there are other people around, services in a manner mode may be provided. For example, services using a speaker may be limited but services using earphones may be provided.

According to embodiments, the context processing unit 830 may transmit surrounding environment information received from the user device to an external system for analyzing surrounding environment, and receive the analyzed surrounding environment information from the external system. The external system may include at least one of a network location information system, a GPS location information system and an indoor location information system. The network location information system may provide location information corresponding to IP addresses collected through a network interface. The GPS location information system may provide location information corresponding to latitude/longitude information collected through GPS. The indoor location information system may provide indoor height information.

The location information received from the external system may be compared POI specified in the service profile. Since error may be caused depending on a method for acquiring location information, a distance between current location and POI may be calculated by considering error range and location secession threshold. When it is determined as that the user device is at POI, services specified in the POI of the service profile may be provided to the user.

When it is determined as that the user device is not at POI, the server may determine whether the user device is located in a secure spot predetermined by the user or a group the user belongs to. If the location of the user device is not a secure spot, the server may determine that the user device in a public place and provide services corresponding to a non-secure mode. For example, services using a speaker may be limited but only those using earphones may be provided in the non-secure mode.

The collaboration processing unit 840 may determine a device to which data for telepresence services is to be transmitted based on the service profile and the device profile and transmit the data to each device. For example, information for devices and functions for telepresence services which can be provided by each device are included in the device profile. For example, when available equipments are a smart TV, a desktop and a smartphone, etc., data for a presentation slide show may be transmitted to the smart TV, video data may be transmitted to the desktop and collaboration data may be transmitted to the smartphone.

The collaboration processing unit 840 may perform signaling with the user device and determine whether to provide services or not based on the signaling result when it is determined as that limiting service is required based on the current service mode or change of the service mode. For example, the collaboration processing unit 840 may perform signaling with the user device for limiting audio services through a speaker when it is changed from the secure mode to the non-secure mode or from the normal mode to the manner mode. For example, the collaboration processing unit 840 may block audio services which are provided to the user device and generate a message informing that earphone connection is required to transmit to the user device when the above-mentioned mode change is caused. When the message informing that earphones are connected is received from the user device, the collaboration processing unit 840 may provide again the blocked audio services.

The database 850 may store at least one of the service profile, the device profile and the POI device profile.

The exemplary embodiment of the present invention can be implemented by various method. For example, the exemplary embodiment of the present invention can be implemented by using hardware, software or its combination. When they are implemented by software, they may be implemented as software executing in more than one processors using various operating systems or platforms. In addition, the software may be created by using any language among various appropriate programming languages or be compiled in machine language codes or intermediate codes executable in a framework or virtual machine.

In addition, when the exemplary embodiment of the present invention is executed in more than one processors, the exemplary embodiment of the present invention may be implemented by processor readable media such as a memory, a floppy disk, a hard disk, a compact disk (CD), an optical disk or a magnetic tape, or the like in which more than one programs are recorded to conduct the implementation of various exemplary embodiments of the present invention.

What is claimed is:

1. A method for providing personalized telepresence services comprising:
   receiving at least one of current location information, peripheral device information acquired at the current location, and noise information acquired at the current location from a user device;
   generating or updating a service profile which specifies a service mode corresponding to the user device and a device profile which specifies functions which the user device and the peripheral devices can provide, based on the received information; and
   transmitting data for telepresence services to at least one device of the user device and the peripheral devices based on the profiles.

2. The method of claim 1, wherein the generating or updating a service profile comprises determining any one service mode among a plurality of service modes based on the current location information and the noise information, and reflecting the determined service mode to the service profile, wherein each of the plurality of services has a different service attributes among each other.

3. The method of claim 2, wherein the transmitting data comprises determining a device to which the data is to be transmitted based on the determined service mode and transmitting the data for telepresence services to the determined device.

4. The method of claim 2, wherein the service attributes is related to at least one of a text service, an audio service and an image service.

5. The method of claim 2, wherein the service attributes is related to at least one of editing, sharing and outputting the data.

6. The method of claim 2, further comprising signaling with the user device to limit an audio service through a speaker and provide an audio service through earphones when the determined service mode is a mode which requires security.

7. The method of claim 1, wherein each device specified in the device profile has a priority to at least one function among functions which can be provided by the corresponding device.

8. The method of claim 1, further comprising:
   receiving POI (point of interest) information for registering POI from the user device and POI device information which is peripheral device information obtained at the POI;
   reflecting the received POI information to the service profile; and
   generating a POI device profile which specifies functions which the user device and the POI devices can provide.

9. The method of claim 8, further comprising transmitting data for telepresence services to the devices which are specified in the POI device profile when the received current location information is related to the POI.

10. The method of claim 1, wherein the generating a service profile comprises:
    transmitting the received current location information to at least one location information server of a network location information server, a GPS location information server and an indoor location information server and receiving the location information analyzed in a corresponding location information server; and
    generating the service profile based on the noise information and the analyzed location information in the location information server.

11. An apparatus for providing personalized telepresence services comprising:
    a context processing unit configured to receive at least one of current location information, peripheral device information acquired at the current location and noise information acquired at the current location from a user device;

a profiler configured to generate or update a service profile which specifies a service mode corresponding to the user device and a device profile which specifies functions which the user device and the peripheral devices can provide, based on the received information; and a collaboration processing unit configured to transmit data for telepresence services to at least one device of the user device and the peripheral devices based on the profiles.

12. The apparatus of claim 11, wherein the profiler determines any one service mode among a plurality of service modes based on the current location information and the noise information, and reflects the determined service mode to the service profile, wherein each of the plurality of services has a different service attributes among each other.

13. The apparatus of claim 12, wherein the collaboration processing unit determines a device to which the data is to be transmitted based on the determined service mode and transmits the data for telepresence services to the determined device.

14. The apparatus of claim 12, wherein the service attributes is related to at least one of a text service, an audio service and an image service.

15. The apparatus of claim 12, wherein the service attributes is related to at least one of editing, sharing and outputting the data.

16. The apparatus of claim 11, wherein the collaboration processing unit performs signaling with the user device to limit an audio service through a speaker and provide an audio service through earphones when the determined service mode is a mode which requires security.

17. The apparatus of claim 11, wherein each device specified in the device profile has a priority to at least one function among functions which can be provided by a corresponding device.

18. The apparatus of claim 11, wherein the context processing unit receives POI information for registering POI from the user device and POI device information which is peripheral device information obtained at the POI; and the profiler reflects the received POI information to the service profile and generates a POI device profile which specifies functions which the user device and the POI devices can provide.

19. The apparatus of claim 18, wherein the collaboration processing unit transmits data for telepresence services to the devices which are specified in the POI device profile when the received current location information is related to the POI.

20. The apparatus of claim 11, wherein the context processing unit transmits the received current location information to at least one location information server of a network location information server, a GPS location information server and an indoor location information server and receives the location information analyzed in a corresponding location information server; and the profiler generates the service profile based on the noise information and the analyzed location information in the location information server.

* * * * *